United States Patent Office 2,870,135
Patented Jan. 20, 1959

2,870,135

METALLIFEROUS POLYAZO DYESTUFFS

Otto Senn, Arlesheim, Basel, Switzerland, assignor, by mesne assignments, to Saul & Co., Newark, N. J., as nominee of Fidelity Union Trust Company, executive trustee under Sandoz Trust No Drawing. Application January 17, 1955
Serial No. 482,436

Claims priority, application Switzerland January 22, 1954

6 Claims. (Cl. 260—145)

The present invention relates to new and valuable metalliferous polyazo dyestuffs.

The said new dyestuffs of the present invention are obtained when (a) on the one hand, one mol of the diazo compound of an aminoazo dyestuff, obtained by coupling a diazomonoazo, a diazodisazo or a diazotrisazo compound, which contains in ortho-position to the diazo group a substituent which enables the formation of metal complex compounds, with a 1-amino-8-hydroxynaphthalene-monosulfonic acid or a 1-amino-8-hydroxynaphthalene-disulfonic acid in the 7-position thereof, and (b) on the other hand, one mol of a diazo or a diazomonoazo compound, which contains in ortho-position to the diazo group a substituent which enables the formation of metal complex compounds, are coupled in any desired order of succession with one mol of 1,3-dihydroxybenzene, and the so-obtained polyazo dyestuff, which contains at least two and at most five sulfonic acid groups, is treated in substance with a metal-yielding agent.

Alternatively, the diazo compound (a) or the diazo compound (b) can be first coupled with the 1,3-dihydroxybenzene, the so-obtained intermediate dyestuff treated with a metal-yielding agent, the metal complex compound then coupled with the diazo compound (b) or the diazo compound (a), and the so-obtained polyazo dyestuff treated in substance with a metal-yielding agent.

The diazomonoazo, diazodisazo and diazotrisazo compounds, used according to the present invention in the preparation of diazo compounds (a) are themselves known and can be prepared in per se conventional manner. Such diazo compounds comprise for example the following aminoazo compounds.

3 - methoxy - 4 - amino - 6 - methyl - 4' - hydroxy - 1,1'-azobenzene-3'-carboxylic acid,
3 - methoxy - 4 - amino - 6 - methyl - 3' - carboxy - 4'-hydroxy-1,1'-azobenzene-5'-sulfonic acid,
1 - amino - 3 - carboxy - 4 - hydroxybenzene - 5 - sulfonic acid→1 - amino - 3 - methylbenzene→1 - amino - 2-methoxy-5-methylbenzene,
4 - amino - 1,1' - azobenzene-3-sulfonic acid→1-amino-2-methoxy-5-methylbenzene,
4 - amino - 1,1' - azobenzene-3-sulfonic acid→1-amino-2-methoxynaphthalene-6-sulfonic acid,
4 - amino-1,1'-azobenzene-3,4'-disulfonic acid→1-amino-2-methoxy-5-methylbenzene,
4 - amino-1,1'-azobenzene-3,4'-disulfonic acid→1a-mino-2-methoxynaphthalene-6-sulfonic acid,
2 - (4'-amino)-phenyl-6-methylbenzthiazole-monosulfonic acid→1-amino-2-methoxy-5-methylbenzene,
2 - (4'-amino)-phenyl-6-methylbenzthiazole-monosulfonic acid→1-amino-2-methoxybenzene,
2 - (4'-amino)-phenyl-6-methylbenzthiazole-monosulfonic acid→1-amino-2-methoxy-5-acetylaminobenzene,
2 - (4'-amino)-phenyl-6-methylbenzthiazole-monosulfonic acid→1 - amino-3-methylbenzene→1-amino-2-methoxynaphthalene-6-sulfonic acid,
2 - (4'-amino)-phenyl-6-methylbenzthiazole-monosulfonic acid→1 - amino-3-methylbenzene→1-amino-2-methoxy-5-methylbenzene,
2 - (4' - amino) - phenyl-6-methylbenzthiazole-disulfonic acid→1 - amino-3-methylbenzene→1-amino-2-methoxynaphthalene-6-sulfonic acid,
2 - (4' - amino) - phenyl-6-methylbenzthiazole-disulfonic acid→1 - amino-3-methylbenzene→1-amino-2-methoxy-5-methylbenzene,
2 - aminonaphthalene-4,8-disulfonic acid→1 - amino-3-methylbenzene→1-amino-2-methoxy-5-methylbenzene,
2 - aminonaphthalene-6,8-disulfonic acid→1 - amino-3-methylbenzene→1-amino-2-methoxy-5-methylbenzene,
4 - amino - 4' - nitro-1,1'-stilbene-2,2'-disulfonic acid→1-amino-2-methoxy-5-methylbenzene,
4 - amino - 4' - nitro-1,1'-stilbene-2,2'-disulfonic acid→1-amino-2-methoxynaphthalene-6-sulfonic acid,
1 - carboxy - 2 - aminobenzene - 5 - sulfonic acid→1-(4'-amino)-phenyl - 3 - methyl-5-pyrazolone→1-amino-2-methoxy-5-methylbenzene,
1 - hydroxybenzene-2-carboxylic acid←4,4'-diamino-1,1'-diphenyl→1-amino-2-methoxy-5-methylbenzene,
1 - hydroxybenzene-2-carboxylic acid←4,4'-diamino-1,1'-diphenyl→1-amino - 2 - methoxynaphthalene-6-sulfonic acid,
1 - hydroxybenzene-2-carboxylic acid←3,3' - dimethoxy-4,4' - diamino - 1,1' - diphenyl→1-amino-2-methoxy-5-methylbenzene,
1 - hydroxybenzene-2-carboxylic acid←3,3' - dimethoxy-4,4' - diamino - 1,1' - diphenyl→1-amino-2-methoxynaphthalene-6-sulfonic acid,
3,3' - dimethoxy-4,4'-diamino-1,1'-diphenyl→1 - hydroxybenzene-2-carboxylic acid,
1 - hydroxybenzene - 2 - carboxylic acid←1-amino-4-(4'-amino)-benzoylaminobenzene→1-amino - 2 - methoxy-5-methylbenzene,
1 - hydroxybenzene - 2 - carboxylic acid←1-amino-4-(4'-amino)-benzoylaminobenzene→1-amino - 2 - methoxynaphthalene-6-sulfonic acid,
1 - amino - 2 - hydroxynaphthalene-4-sulfonic acid→1-amino - 3 - hydroxybenzene→1 - amino-2-methoxy-5-methylbenzene,
1 - hydroxybenzene - 2 - carboxylic acid←1-amino-4-(4'-amino)-benzoylaminobenzene-2-carboxylic acid,
1 - hydroxybenzene - 2 - carboxylic acid←1-amino-4-(3'-methyl-4'-amino) - benzoylaminobenzene-2-carboxylic acid, etc.

The coupling of the diazomonoazo, diazodisazo and diazotrisazo compounds to the 7-position of the 1-amino-8-hydroxynaphthalene-monosulfonic or disulfonic acids—the preferred ones being the 4-monosulfonic acid and the 3,6- and 4,6-disulfonic acids—generally takes place in weakly alkaline solution. In some cases, particularly in employing a 1-amino-2-alkoxynaphthalene-6-sulfonic acid, it may be advantageous to add a coupling-enhancing agent such, for example, as pyridine or the like.

The diazotization of the intermediate compounds to the diazo compounds (a) is generally carried out by the indirect method. Illustrative of the amines which are suitable for the preparation of the diazo compounds (b) are inter alia:

1-hydroxy-2-aminobenzene-4-sulfonic acid,
1-methoxy-2-aminobenzene-4-sulfonic acid,
1-hydroxy-2-aminobenzene-4-sulfonic acid amide,
1-methoxy-2-aminobenzene-4-sulfonic acid amide,
1-hydroxy-2-amino-4-nitrobenzene,
1-hydroxy-2-amino-4-nitrobenzene-6-sulfonic acid,
1-hydroxy-2-amino-4,6-dinitrobenzene,
1-aminobenzene-2-carboxylic acid,
1-hydroxy-2-amino-6-chlorobenzene-4-sulfonic acid,
1-methoxy-2-amino-5-nitrobenzene,
1-methoxy-2-amino-5-nitrobenzene-4-sulfonic acid,
1-amino-2-hydroxynaphthalene-4-sulfonic acid,
1-amino-2-methoxynaphthalene-6-sulfonic acid,
3-methoxy-4-amino-6-methyl - 4'-hydroxy - 1,1' - azobenzene-3'-carboxylic acid,
3 - methoxy - 4 - amino-6-methyl-3'-carboxy-4'-hydroxy-1,1'-azobenzene-5-sulfonic acid,
3 - methoxy - 4 - amino-6-methyl-1,1'-azobenzene-3'-sulfonic acid,
3 - methoxy - 4 - amino-6-methyl-1,1'-azobenzene-4'-sulfonic acid,
3-amino-4-hydroxy-1,1'-azobenzene-3'-sulfonic acid, etc.

The first coupling onto the 1,3-dihydroxybenzene can take place in (acetic) acid, neutral or weakly alkaline solution, while the carrying out of the second coupling generally requires, in addition to the presence of an alkaline agent such as ammonia or sodium carbonate, a diazo stabilizer such as naphthalene-2-sulfonic acid and, in some cases, a coupling-enhancing agent such for example as pyridine.

The polyazo dyestuffs according to the invention correspond, in the metal-free state to the formula

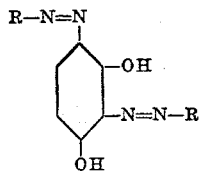

wherein one R stands for the radical of a diazo compound of an aminoazo dyestuff, obtained by coupling a diazomonoazo, a diazodisazo or a diazotrisazo compound, which contains in ortho-position to the diazo group a substituent which enables the formation of metal complex compounds, at the 7-position of a 1-amino-8-hydroxy-naphthalene-monosulfonic acid or a 1-amino-8-hydroxy-naphthalene-disulfonic acid, and the other R stands for the radical of a diazo or a diazomonoazo compound, which contains in ortho-position to the diazo group a substituent which enables the formation of metal complex compounds. The said dyestuffs can all be converted into complex compounds by bivalent metals and in this form can be used as direct dyestuffs, the inherently good properties of which can be still further improved by after-treating the dyeings with salts of bivalent copper, if necessary in the presence of polymeric substances which contain imino or amino groups. The shades of the obtained dyeings vary within wide limits between blue, olive, khaki, brown and gray. The metal complex compounds can be prepared in conventional manner and, most advantageously, by heating the aqueous dyestuff pastes or solutions with metal-yielding agents in the presence of alkali salts of low-molecular aliphatic carboxylic acids. The metals which are particularly suitable for preparing the metal complex compounds are nickel and especially copper.

The following examples and tables set forth presently-preferred representative embodiments of the invention; these are intended to be solely illustrative and not at all limitative. In the examples the parts and percentages are by weight; the temperatures are in degrees centigrade.

EXAMPLE 1

The tetrazo compound of 22.7 parts of 1-amino-4-(4'-amino)-benzoylaminobenzene is coupled, in per se conventional manner, first in soda-alkaline solution with 13.8 parts of 1-hydroxybenzene-2-carboxylic acid, and then in acetic acid solution with 13.7 parts of 1-amino-2-methoxy-5-methylbenzene. The so-obtained amino-disazo compound is diazotized and coupled in weakly alkaline solution with 31.9 parts of 1-amino-8-hydroxy-naphthalene-3,6-disulfonic acid. Thereupon, 6.9 parts of sodium nitrite are added to the solution, which is then poured into 30 parts of 30% hydrochloric acid at 10°. Upon completion of the diazotization, the diazotrisazo compound is coupled, in soda-alkaline solution, with 11 parts of 1,3-dihydroxybenzene. The resultant tetrakisazo compound is isolated, dissolved in water together with 23 parts of sodium naphthalene-2-sulfonate, and the solution coupled in the presence of 50 parts of ammonia or 200 parts of pyridine with the diazo compound of 20.3 parts of 1-methoxy-2-aminobenzene-4-sulfonic acid. The obtained pentakisazo dyestuff is isolated and purified in conventional manner.

For conversion of the pentakisazo dyestuff into the copper complex compound, the moist filter cake is introduced at 80–90° into a melt consisting of 100 parts of water, 50 parts of crystalline copper sulfate and 350 parts of crystalline sodium acetate, after which the fusion is heated and water distilled therefrom until a temperature of 107° is attained. Thereupon boiling is continued under reflux until the complex formation is completed, which requires about 12–20 hours. In order to isolate the dyestuff, sufficient water is added to the fusion to enable the salts to go into solution while the dyestuff remains undissolved and is filtered off and dried. It corresponds to the formula

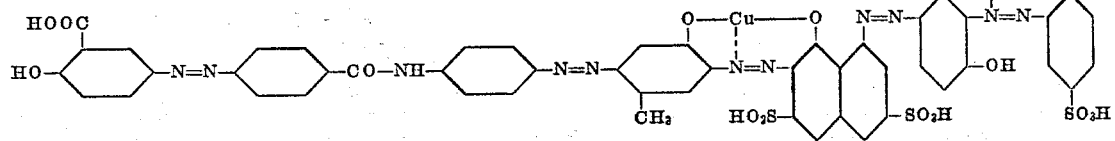

and dissolves with yellow-brown coloration in water and with red-brown coloration in concentrated sulfuric acid and dyes cotton and fibers of regenerated cellulose in brownish khaki shades of outstanding fastness to light and good fastness to washing, to wet treatments and to perspiration.

EXAMPLE 2

The pentakisazo dyestuff of Example 1 is also obtained by converting the tetrakisazo compound into the copper complex compound with the aid of 25 parts of crystalline copper sulfate, and then building up the pentakisazo dyestuff after the manner described in Example 1. By treating the pentakisazo dyestuff with 25 parts of crystalline copper sulfate, there is obtained the end dyestuff which contains two atoms of copper in complex combination and which is identical with the end dyestuff of Example 1.

Table 1, which follows, sets forth additional polyazo dyestuffs which can be prepared by coupling a diazo compound (a) and a diazo compound (b) with 1,3-dihydroxybenzene, after the manner described in Examples 1 and 2. In this connection, it is to be noted that, when preparing diazo components (a) from diazomonoazo or diazodisazo or diazotrisazo compounds, which contain an end-positioned radical of 1-amino-2-alkoxynaphthalene-6-sulfonic acid, and from 1-amino-8-hydroxynaphthalene-monosulfonic or disulfonic acids, it is very advantageous to add a tertiary organic base such for example as pyridine or quinoline.

The polyazo dyestuffs are characterized by the diazo components (a) in column (B), the diazo components (b) in column (C), and the shades of the coppered dyeings and the dyeings with copper complex compounds in column (D).

added, and diazotization carried out by the addition of 30 parts of 30% hydrochloric acid at 10°. The resultant diazo compound is then coupled with 11 parts of 1,3-dihydroxybenzene in the presence of 200 parts of sodium carbonate at 0°. The so-produced green trisazo dyestuff is precipitated with sodium chloride, then dissolved in 2000 parts of water with the addition of 23 parts of naphthalene-2-sulfonic acid and 50 parts of ammonia, and coupled at 0° with the diazo compound of 20.3 parts of 1-methoxy-2-aminobenzene-4-sulfonic acid. The so-obtained olive-dyed tetrakisazo dyestuff is filtered off and is purified by reprecipitation from hot water.

For conversion of the said tetrakisazo dyestuff into the copper complex compound, the former is dissolved in 3000 parts of water, after which 100 parts of sodium acetate and 50 parts of crystalline copper sulfate are added to the solution which is then heated in an enameled pressure vessel for 4 to 6 hours at 110–120°, until the color has changed to a dark brown. The dyestuff is then salted out with sodium chloride, filtered and dried. It corresponds to the formula

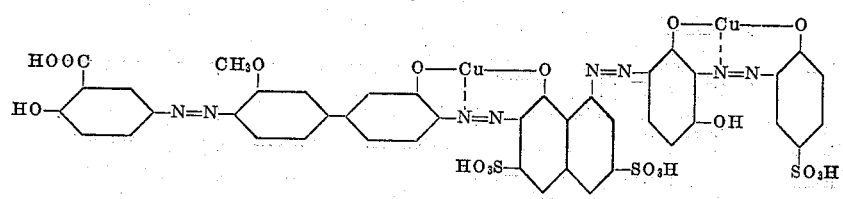

and is a dark powder which dissolves with dark brown coloration in water and with violet-brown coloration

*Table 1*

| (A) Example No. | (B) Diazo components (a) | | (C) Diazo components (b) | (D) Shade of dyeings of copper complex compounds on cotton |
|---|---|---|---|---|
| | Diazo-mono- or -dis- or -tris-azo compound (B₁) | 1-amino-8-hydroxy-naphthalene-mono- or -disulfonic acid (B₂) | | |
| 3 | 1-hydroxybenzene-2-carboxylic acid ← 1-amino-4-(4'-amino)-benzoylaminobenzene → 1-amino-2-methoxy-5-methylbenzene. | 1-amino-8-hydroxynaphthalene-3,6-disulfonic acid. | 1-methoxy-2-amino-5-nitrobenzene-4-sulfonic acid. | Brown. |
| 4 | ....do.... | ....do.... | 1-amino-2-methoxynaphthalene-6-sulfonic acid. | Do. |
| 5 | ....do.... | ....do.... | 1-hydroxy-2-aminobenzene-4-sulfonic acid. | Brownish khaki. |
| 6 | ....do.... | ....do.... | 1-hydroxy-2-amino-6-chlorobenzene 4-sulfonic acid. | Khaki. |
| 7 | ....do.... | ....do.... | 1-hydroxy-2-amino-4-nitrobenzene-6-sulfonic acid. | Do. |
| 8 | ....do.... | ....do.... | 1-hydroxy-2-amino-4,6-dinitrobenzene. | Do. |
| 9 | ....do.... | ....do.... | 1-amino-2-hydroxynaphthalene-4-sulfonic acid. | Olive. |
| 10 | 1-hydroxybenzene-2-carboxylic acid ← 1-amino-4-(4'-amino)-benzoylaminobenzene → 1-amino-2-methoxynaphthalene-6-sulfonic acid. | ....do.... | 1-methoxy-2-aminobenzene-4-sulfonic acid. | Brown. |
| 11 | ....do.... | 1-amino-8-hydroxynaphthalene-4-sulfonic acid. | 1-hydroxy-2-amino-4-nitrobenzene-6-sulfonic acid. | Do. |
| 12 | ....do.... | 1-amino-8-hydroxynaphthalene-3,6-disulfonic acid. | 1-hydroxy-2-amino-4-nitrobenzene. | Do. |

EXAMPLE 13

The disazo dyestuff, prepared in per se conventional manner from 24.4 parts of tetrazotized 4,4'-diamino-3,3'-dimethoxy-1,1'-diphenyl, 13.8 parts of 1-hydroxybenzene-2-carboxylic acid and 31.9 parts of 1-amino-8-hydroxy-naphthalene-3,6-disulfonic acid, is dissolved in 2000 parts of water after which 6.9 parts of sodium nitrite are added, in concentrated sulfuric acid and dyes cotton and fibers of regenerated cellulose in fast black-brown shades.

Table 2 which follows sets forth additional polyazo dyes which can be prepared after the manner described in Example 13. The significances of B, C and D is the same as in Table 1.

TABLE 2

| (A) | (B) | | (C) | (D) |
|---|---|---|---|---|
| | (B₁) | (B₂) | | |
| 14 | 1-hydroxybenzene-2-carboxylic acid ⟵ 3,3'-dimethoxy-4,4'-diamino-1,1'-diphenyl. | 1-amino-8-hydroxynaphthalene-4-sulfonic acid. | 1-methoxy-2-aminobenzene-4-sulfonic acid. | Brown. |
| 15 | ....do.... | 1-amino-8-hydroxynaphthalene-3,6-disulfonic acid. | 1-methoxy-2-amino-6-chlorobenzene-4-sulfonic acid. | Do. |
| 16 | ....do.... | ....do.... | 1-hydroxy-2-amino-6-chlorobenzene-4-sulfonic acid. | Do. |
| 17 | ....do.... | ....do.... | 1-aminobenzene-2-carboxylic acid. | Olive-brown. |
| 18 | ....do.... | ....do.... | 1-hydroxy-2-amino-6-nitrobenzene-4-sulfonic acid. | Brown. |
| 19 | ....do.... | ....do.... | 3-methoxy 4-amino-6-methyl-3'-carboxy-4'-hydroxy-1,1'-azobenzene-5'-sulfonic acid. | Violet-brown. |
| 20 | ....do.... | ....do.... | 3-methoxy-4-amino-6-methyl-1,1'-azobenzene-4'-sulfonic acid. | Do. |
| 21 | 1-hydroxybenzene-2-carboxylic acid ⟵ 1-amino-4-(4'-amino)-benzoylaminobenzene-2-carboxylic acid. | ....do.... | 1-methoxy-2-aminobenzene-4-sulfonic acid. | Khaki. |
| 22 | ....do.... | ....do.... | 1-hydroxy-2-amino-6-nitrobenzene-4-sulfonic aid. | Do. |
| 23 | 1-hydroxybenzene-2-carboxylic acid ⟵ 1-amino-4-(3'-methyl-4'-amino)-benzoylaminobenzene-2-carboxylic acid. | ....do.... | 1-methoxy-2-aminobenzene-4-sulfonic acid. | Do. |
| 24 | 1-hydroxybenzene-2-carboxylic acid ⟵ 3,3'-dimethoxy-4,4'-diamino-1,1'-diphenyl ⟶ 1-amino-2-methoxy-5-methylbenzene. | ....do.... | ....do.... | Brown. |
| 25 | ....do.... | ....do.... | 1-methoxy-2-amino-5-nitrobenzene-4-sulfonic acid. | Do. |
| 26 | 1-hydroxybenzene-2-carboxylic acid ⟵ 3,3'-dimethoxy-4,4'-diamino-1,1'-diphenyl ⟶ 1-amino-2-methoxynaphthalene-6-sulfonic acid. | ....do.... | 1-methoxy-2-aminobenzene-4-sulfonic acid. | Do. |
| 27 | 1-hydroxybenzene-2-carboxylic acid ⟵ 1,4-diaminobenzene ⟶ 1-amino-2-methoxynaphthalene-6-sulfonic acid. | ....do.... | ....do.... | Do. |
| 28 | 1-hydroxybenzene-2-carboxylic acid ⟵ 4,4'-diamino-1,1'-diphenyl ⟶ 1-amino-2-methoxy-5-methylbenzene. | ....do.... | ....do.... | Do. |
| 29 | ....do.... | ....do.... | 1-methoxy-2-amino-5-nitrobenzene-4-sulfonic acid. | Do. |
| 30 | ....do.... | ....do.... | 1-hydroxy-2-amino-4-nitrobenzene-6-sulfonic acid. | Do. |
| 31 | ....do.... | ....do.... | 1-hydroxy-2-amino-6-nitrobenzene-4-sulfonic acid. | Do. |
| 32 | ....do.... | ....do.... | 1-hydroxy-2-amino-6-chlorobenzene-4-sulfonic acid. | Khaki. |
| 33 | ....do.... | ....do.... | 1-amino-2-hydroxynaphthalene-4-sulfonic acid. | Brown. |
| 34 | 1-hydroxybenzene-2-carboxylic acid ⟵ 4,4'-diamino-1,1'-diphenyl ⟶ 1-amino-2-methoxynaphthalene-6-sulfonic acid. | ....do.... | 1-methoxy-2-aminobenzene-4-sulfonic acid. | Do. |
| 35 | ....do.... | 1-amino-8-hydroxynaphthalene-4-sulfonic acid. | 1-hydroxy-2-amino-4-nitrobenzene-6-sulfonic-acid. | Yellow-brown. |

A representative product of the foregoing examples is that of Example 24 which corresponds to the formula

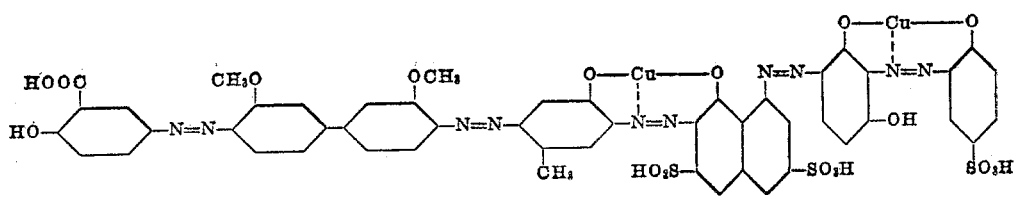

EXAMPLE 36

32 parts of 2-(4'-amino)-phenyl-6-methylbenzthiazole-monosulfonic acid are diazotized in conventional manner with 6.9 parts of sodium nitrite. The precipitated diazo compound is filtered off and is introduced at 15° into an aqueous suspension of 12.3 parts of 1-amino-2-hydroxy-5-methylbenzene, which also contains 100 parts of acetone and 10 parts of sodium thiosulfate. (The aqueous suspension of 1-amino-2-hydroxy-5-methylbenzene is prepared by neutralizing a solution of 12.3 parts of the base in 50 parts of water and 13.5 parts of 30% hydrochloric acid by the dropwise addition of 13.8 parts of aqueous 30% caustic soda solution.) Upon completion of the coupling, the resultant monoazo compound is salted out, filtered and purified. It is then dissolved in 400 parts of water with the addition of 6.9 parts of sodium nitrite and is indirectly diazotized with 28 parts of 30% hydrochloric acid in the presence of 75 parts of sodium chloride. The so-prepared diazo compound is filtered, stirred up with a small quantity of water and added at 0–5° to a solution of 31.9 parts of 1-amino-8-hydroxynaphthalene-3,6-disulfonic acid in 300 parts of water, 14 parts of aqueous 30% caustic soda solution, 20 parts of sodium carbonate and 200 parts of pyridine. Upon completion of the coupling, the formed green disazo compound is separated from the pyridine by precipitation with hydrochloric acid, dissolved under alkaline conditions in 400 parts of water, 6.9 parts of sodium nitrite added to the solution, and the whole poured into 45 parts of hydrochloric acid at 10°. The solution is stirred until the ensuing diazotization is completed, and then the diazodisazo compound is coupled at 0° with a solution of 11 parts of 1,3-dihydroxybenzene and 30 parts of sodium carbonate in 200 parts of water. The so-obtained green trisazo compound is precipitated by the addition of sodium chloride at 70°, is filtered and is then dissolved in 400 parts of water and 200 parts of pyridine. A suspension, prepared in the usual way, of the diazo compound of 15.4 parts of 1-hydroxy-2-amino-4-nitrobenzene is then run into the solution at 0°. The formed tetrakisazo dyestuff is separated from the pyridine and is purified by reprecipitation. It is a dark powder which dissolves with red coloration in concentrated hydrochloric acid and with brown coloration in water, and dyes cotton and fibers of regenerated cellulose brown.

To prepare the copper complex compound thereof, the moist tetrakisazo dyestuff paste is dissolved in 600 parts of water at 70°, after which 25 parts of sodium acetate are added, followed dropwise, by a 20% aqueous solution of 50 parts of crystalline copper sulfate, until excess copper can be detected in the dyestuff solution. The copper-containing tetrakisazo dyestuff is then precipitated by the addition of sodium chloride to the coppering solution, after which the precipitated dye is filtered off and finally dried. It corresponds to the formula

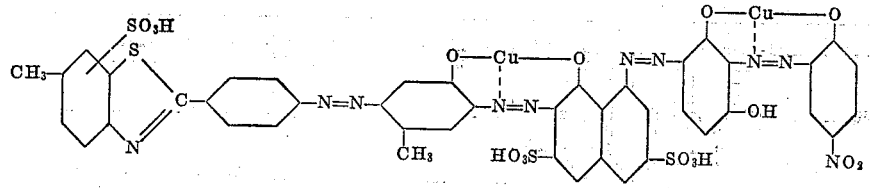

and is a dark powder which yields fast brown dyeings on cotton and fibers of regenerated cellulose.

EXAMPLE 37

32 parts of 2-(4'-amino)-phenyl-6-methylbenzthiazole-monosulfonic acid are diazotized in conventional manner with 6.9 parts of sodium nitrite. A hydrochloric acid solution of 13.7 parts of 1-amino-2-methoxy-5-methylbenzene is then run into the diazo suspension, and the acid reaction is neutralized by the addition of sodium acetate. Upon disappearance of the diazo compound, the formed monoazo dyestuff is filtered and is converted into the difficulty soluble sodium salt. This is dispersed in 500 parts of water, 6.9 parts of sodium nitrite are added, and diazotization is effected by the addition of 40 parts of concentrated hydrochloric acid. After several hours the diazo compound is run into an alkaline solution of 31.9 parts of 1-amino-8-hydroxy-naphthalene-3,6-disulfonic acid. Coupling to the disazo dyestuff takes place fairly rapidly. To the solution of the gray-blue disazo dyestuff, 6.9 parts of sodium nitrite are added and diazotization effected by means of aqueous hydrochloric acid. Coupling is then carried out with a solution containing 11 parts of 1,3-dihydroxybenzene and 30 parts of sodium carbonate. The obtained trisazo compound is coupled in the presence of 50 parts of ammonia with the diazo solution of 20.3 parts of 1-amino-2-methoxybenzene-4-sulfonic acid. The resultant pentakisazo dyestuff is isolated and dried.

The said pentakisazo dyestuff can be converted into the copper complex compound after the manner set forth in Example 1. The copper complex compound thus prepared corresponds to the formula

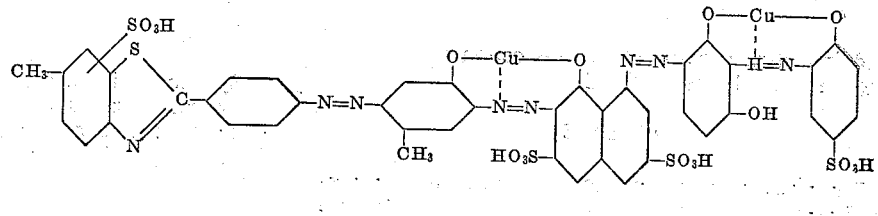

and is a dark powder which dissolves with dark brown coloration in water and with violet-red coloration in concentrated sulfuric acid, and dyes cotton and fibers of regenerated cellulose in dark brown shades with good fastness to light and to washing.

Table 3 which follows sets forth additional polyazo dyestuffs which can be prepared in the manner described in Examples 36 and 37. In such table, columns B, C and D have the same significance as in Table 1,

Table 3

| (A) Example No. | (B) (B₁) | (B) (B₂) | (C) | (D) |
|---|---|---|---|---|
| 38 | 2-(4'-amino)-phenyl-6-methylbenzthiazole-sulfonic acid ⟶ 1-methoxy-2-aminobenzene. | 1-amino-8-hydroxy-naphthalene-3,6-disulfonic acid. | 1-methoxy-2-aminobenzene-5-sulfonic acid. | Brown. |
| 39 | 2-(4'-amino)-phenyl-6-methylbenzthiazole-sulfonic acid ⟶ 1-methoxy-2-amino-4-acetylaminobenzene. | ...do... | ...do... | Do. |
| 40 | 2-(4'-amino)-phenyl-6-methylbenzthiazole-sulfonic acid ⟶ 1-methoxy-2-amino-4-methylbenzene. | ...do... | 3-methoxy-4-amino-6-methyl-3'-carboxy-4'-hydroxy-1,1'-azobenzene-5'-sulfonic acid. | Do. |
| 41 | 2-(4'-amino)-phenyl-6-methylbenzthiazole-3'-sulfonic acid ⟶ 1-methoxy-2-amino-4-methylbenzene. | ...do... | 1-methoxy-2-aminobenzene-5-sulfonic acid. | Do. |
| 42 | 1-amino-4-hydroxybenzene-3-carboxylic acid ⟶ 1-amino-2-methoxy-5-methylbenzene. | ...do... | 1-hydroxy-2-amino-4-nitrobenzene. | Do. |
| 43 | 1-amino-2-hydroxy-3-carboxybenzene-5-sulfonic acid ⟶ 1-amino-2-methoxy-5-methylbenzene. | ...do... | ...do... | Do. |
| 44 | 1-amino-2-hydroxy-naphthalene-4-sulfonic acid ⟶ 1-amino-3-hydroxybenzene ⟶ 1-amino-2-methoxy-5-methylbenzene. | ...do... | ...do... | Blue. |
| 45 | 1-amino-2-hydroxybenzene-5-sulfonic acid ⟶ 1-(4'-amino)-phenyl-3-methyl-5-pyrazolone ⟶ 1-amino-2-methoxy-5-methylbenzene. | ...do... | 1-methoxy-2-aminobenzene-4-sulfonic acid. | Brown. |
| 46 | 1-aminonaphthalene-4,8-disulfonic acid ⟶ 1-amino-3-methylbenzene ⟶ 1-amino-2-methoxy-5-methylbenzene. | ...do... | 1-hydroxy-2-amino-4-nitrobenzene. | Do. |
| 47 | 4-amino-4'-nitro-1,1'stilbene-2,2'-disulfonic acid ⟶ 1-amino-2-methoxynaphthalene-6-sulfonic acid. | ...do... | 1-methoxy-2-aminobenzene. | Do. |

EXAMPLE 48

The nickel complex compound of the metal-free dyestuff described in Example 1 is obtained when such dyestuff is treated in accordance with the said example, but replacing the 50 parts of crystalline copper sulfate by 56 parts of crystalline nickel sulfate. The nickel-containing pentakisazo dyestuff corresponds to the formula

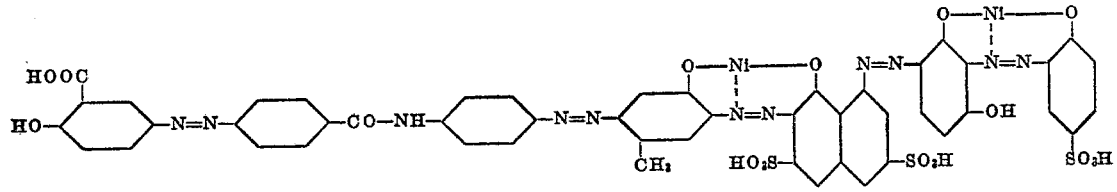

and is a dark powder which dyes cotton and fibers of regenerated cellulose in olive shades.

EXAMPLE 49

The nickel complex compound of the tetrakisazo dyestuff described in Example 13 can be prepared after the manner set forth in Example 48. This nickel complex compound corresponds to the formula

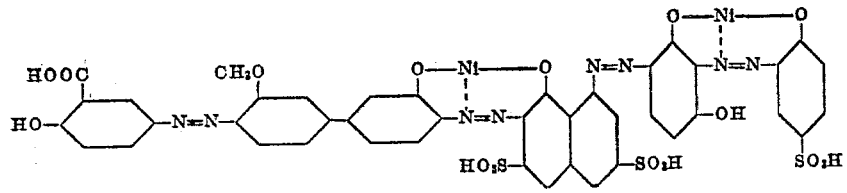

40 and dyes a more yellowish brown than the corresponding copper complex compound, being distinguished by its outstanding light fastness.

In essentially similar manner, nickel complex compounds may be prepared corresponding to any of the other copper complex compounds herein disclosed.

EXAMPLE 50

By coupling in the presence of pyridine the diazodisazo compound prepared according to Example 36 with the monoazo compound prepared in conventional manner from 18.9 parts of diazotized 1-hydroxy-2-aminobenzene-4-sulfonic acid and 11 parts of 1,3-dihydroxybenzene, a tetrakisazo dyestuff is obtained which dyes cotton and fibers of regenerated cellulose in fast gray shades by the aftercoppering process. Its solution in water and in concentrated sulfuric acid is greenish gray. The copper complex compound, which corresponds to the formula

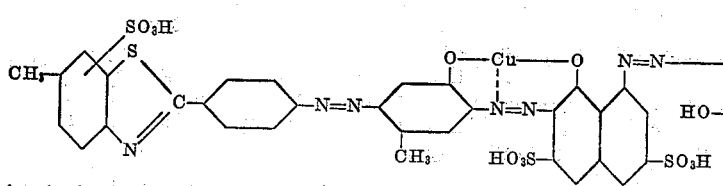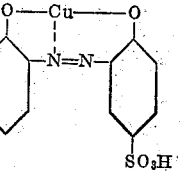

is obtained after the manner described in Example 36. It is isomeric with the copper complex compound of Example 37 and yields fast gray dyeings.

EXAMPLE 51

The aminodisazo compound, prepared in conventional manner from 18.4 parts of 4,4'-diamino-1,1'-diphenyl, 13.8 parts of 1-hydroxybenzene-2-carboxylic acid and 25.3 parts of 1-amino-2-methoxynaphthalene-6-sulfonic acid, is finely dispersed in 300 parts of water. 6.9 parts of sodium nitrite are added to the resultant suspension which is then poured, at 20°, into 30 parts of 30% hydrochloric acid. After stirring for several hours, the diazo compound is filtered, stirred together with 200 parts of ice water, and the resultant suspension added at 0° to a solution of 31.9 parts of 1-amino-8-hydroxynaphthalene-3,6-disulfonic acid in 200 parts of water, 30 parts of 25% aqueous ammonia and 300 parts of pyridine. Upon completion of the coupling the formed green trisazo compound is precipitated by acidification, and is then filtered and dissolved, under alkaline conditions, in 1000 parts of water. 6.9 parts of sodium nitrite are added to the solution, after which the latter is added at 10° to 40 parts of 30% hydrochloric acid. After several hours, the obtained diazo compound is filtered and stirred into 200 parts of ice water. The resultant suspension is added at 0° to a solution, in 200 parts of water and 200 parts of pyridine, of the copper complex compound of the monoazo dyestuff, prepared by coupling 1-hydroxy-2-aminobenzene-4-sulfonic acid with 11 parts of 1,3-dihydroxybenzene.

The so-prepared pentakisazo dyestuff is isolated, purified, and converted into its complex copper compound after the manner set forth in Example 1, employing 25 parts of crystalline copper sulfate. The copper-containing dyestuff corresponds to the formula acid. The diazo mass is combined with an alkaline solution of 15.1 parts of 1-hydroxy-2-acetylaminobenzene.

By boiling the solution in a 1% aqueous sodium hydroxide solution, the acetyl group of the formed monoazo compound is split off. The thus-prepared aminoazo compound is precipitated by the addition of hydrochloric acid to the solution and is then filtered. It is dissolved by the addition of alkali hydroxide, 6.9 parts of sodium nitrite are added to the solution, which is then run into 30 parts of concentrated hydrochloric acid. The resultant solution of the diazoazo compound is coupled with a strongly alkaline solution of 11 parts of 1,3-dihydroxybenzene. The so-prepared disazo compound precipitated with the aid of sodium chloride, is coupled, in the form of a 20% pyridine solution, with the diazodisazo compound, prepared according to Example 37, of 32 parts of 2-(4'-amino)-phenyl - 6 - methylbenzthiazole - monosulfonic acid, 13.7 parts of 1-amino-2-methoxy-5-methylbenzene and 31.9 parts of 1-amino-8-hydroxynaphthalene-3,6-disulfonic acid. The pentakisazo dyestuff, thus obtained, is freed of pyridine and is purified by reprecipitation from hot water.

The corresponding copper complex compound is prepared after the manner set forth in Example 1. It corresponds to the formula

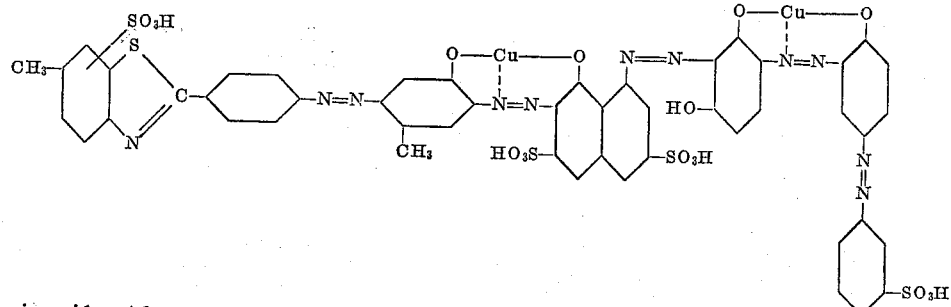

and dissolves with gray coloration in water and with violet coloration in concentrated sulfuric acid, and dyes cotton and fibers of regenerated cellulose in fast gray shades.

EXAMPLE 53

100 parts of cotton are entered at room temperature (about 20–30°) into a solution of 0.6 part of the dyestuff prepared according to Example 13, and 2 parts of trisodium phosphate (or sodium metaphosphate or trisodium polyphosphate) in 3000 parts of water, with the addition of 10 parts of Glauber's salt. The dyebath is heated to boiling temperature in the course of 30 minutes. During

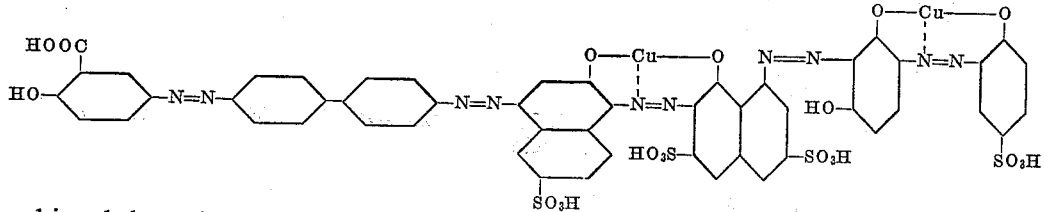

and is a dark powder which dissolves with green coloration in water and dyes cotton and fibers of regenerated cellulose in fast olive shades.

EXAMPLE 52

17.2 parts of 1-aminobenzene-3-sulfonic acid are diazotized in conventional manner, employing 6.9 parts of sodium nitrite and 25 parts of concentrated hydrochloric such heating, an additional 10 parts of Glauber's salt are added. Dyeing of the cotton is carried out at boiling temperature for 15 minutes. At the end of this time, 20 more parts of Glauber's salt are added; after which the dyeing is completed in the course of 15–20 minutes in the cooling bath. The cotton is withdrawn from the bath, is thoroughly rinsed and dried. It is dyed in a black-brown shade.

The fastness properties of the dyeing can be further enhanced by a treatment with a copper-containing polyalkylenepolyamine. To this end, 100 parts of dyed and dried cotton are introduced at 30° into a bath consisting of 3000 parts of water and 2 parts of a copper-containing polyalkylenepolyamine. The bath is heated to 70° and the dyed cotton is kept therein for 30 minutes. Thereupon the dyed and treated cotton is rinsed and dried. Its shade remains unchanged.

Having thus disclosed the invention what is claimed is:

1. A metal complex compound selected from the group consisting of copper and nickel complex compounds of polyazo dyestuffs which correspond in the metal-free state to the formula

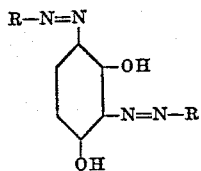

wherein one R stands for the radical of a diazo compound of an aminoazo dyestuff, obtained by the coupling of a member selected from the group consisting of a diazomonoazo, a diazodisazo and a diazotrisazo compound, each of the said compounds containing as components aromatic radicals selected from the group consisting of radicals of the benzene, naphthalene, diphenyl, stilbene, pyrazolone and benzthiazole series, and including in the ortho-position to the diazo group a substituent selected from the group consisting of hydroxy, methoxy and carboxy, with a member selected from the group consisting of a 1-amino-8-hydroxynaphthalene-monosulfonic acid and a 1-amino-8-hydroxynaphthalene-disulfonic acid in the 7-position, and the other R stands for a member selected from the group consisting of radicals of diazo and diazomonoazo compounds, each of the said compounds containing as components aromatic radicals selected from the group consisting of radicals of the benzene and naphthalene series, and including in the ortho-position to the diazo group a substituent selected from the group consisting of hydroxy, methoxy and carboxy.

2. The polyazo dyestuff which corresponds to the formula

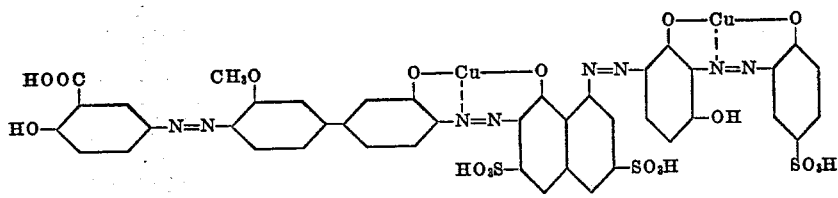

3. The polyazo dyestuff which corresponds to the formula

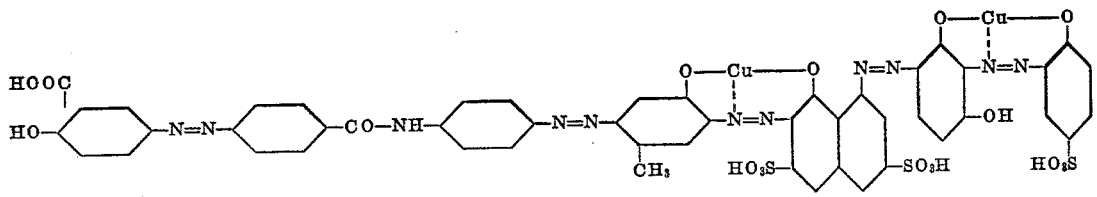

4. The polyazo dyestuff which corresponds to the formula

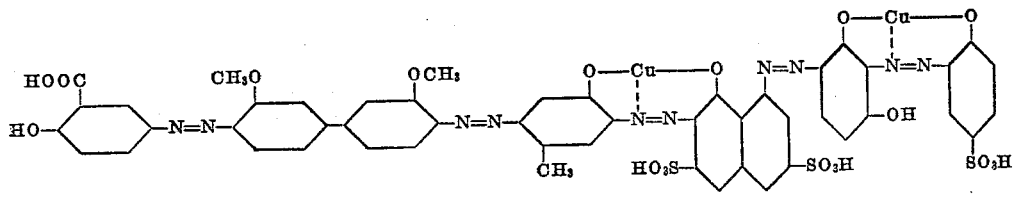

5. The polyazo dyestuff which corresponds to the formula

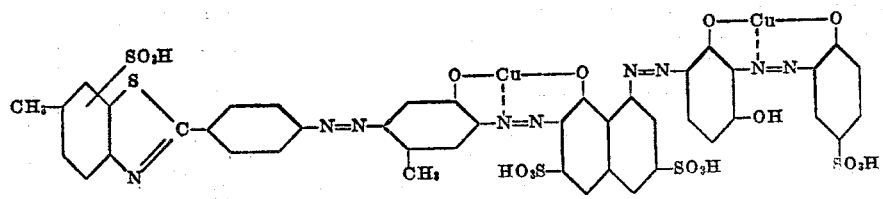

6. The polyazo dyestuff which corresponds to the formula
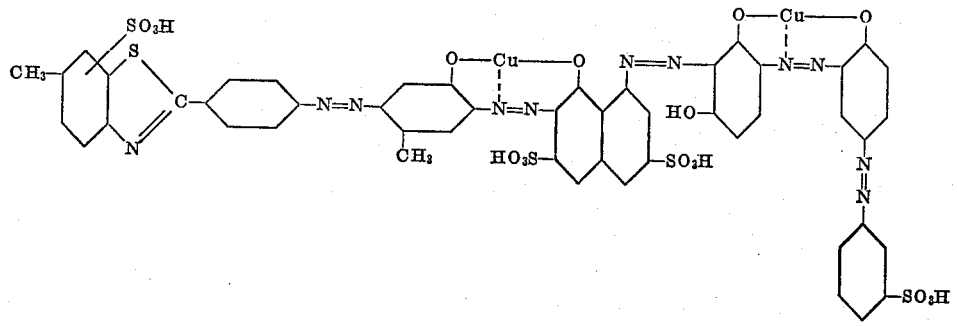
References Cited in the file of this patent
UNITED STATES PATENTS
| | | |
|---|---|---|
| 2,152,652 | Lange | Apr. 4, 1939 |
| 2,168,571 | Krzikalla | Aug. 8, 1939 |
| 2,259,735 | Crossley et al. | Oct. 21, 1941 |
| 2,417,306 | Krebser et al. | Mar. 11, 1947 |
| 2,673,200 | Ruckstuhl et al. | Mar. 23, 1954 |
OTHER REFERENCES
Venkataraman: "Synthetic Dyes," vol. I, p. 523.

UNITED STATES PATENT OFFICE
Certificate of Correction

Patent No. 2,870,135            January 20, 1959

Otto Senn

It is hereby certified that error appears in the above numbered patent requiring correction and that the said Letters Patent should read as corrected below.

Column 1, line 62, for "acid→1a-mino-" read —acid→1-amino- —; column 10, lines 51 to 66 inclusive, Example 37, right-hand portion of the formula should appear as shown below instead of as in the patent:

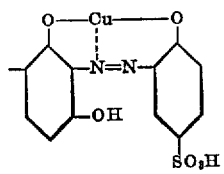

Signed and sealed this 28th day of July 1959.

[SEAL]

Attest:
KARL H. AXLINE,
*Attesting Officer.*

ROBERT C. WATSON,
*Commissioner of Patents.*